United States Patent

[11] 3,629,053

| [72] | Inventors | Isao Kimura<br>Suita;<br>Fumimaro Ogata, Osaka, both of Japan |
|---|---|---|
| [21] | Appl. No. | 866,745 |
| [22] | Filed | Oct. 15, 1969 |
| [45] | Patented | Dec. 21, 1971 |
| [73] | Assignee | Kanegafuchi Boseki Kabushiki Kaisha<br>Tokyo, Japan |
| [32] | Priorities | Oct. 23, 1968 |
| [33] | | Japan |
| [31] | | 43/77157;<br>Jan. 27, 1969, Japan, No. 44/6173; Jan. 27, 1969, Japan, No. 44/6174; Feb. 18, 1969, Japan, No. 44/12097; Feb. 18, 1969, Japan, No. 44/12098; Feb. 18, 1969, Japan, No. 44/12099 |

[54] NOVEL POLYAMIDE AND FIBER THEREOF
43 Claims, No Drawings

[52] U.S. Cl. .................................................. 161/173,
161/172, 161/175, 260/78 R, 260/857, 264/171
[51] Int. Cl. .................................................. D02g 3/02,
C08g 20/00, C08g 41/04
[50] Field of Search .................................................. 161/172,
173, 175, 177; 260/78 R, 78 A, 857; 264/171

[56] References Cited
UNITED STATES PATENTS

| 3,489,641 | 1/1970 | Harcolinski et al. .......... | 161/173 |
| 3,511,749 | 5/1970 | Ogata et al. .................... | 161/173 |

*Primary Examiner*—Robert F. Burnett
*Assistant Examiner*—Linda C. Koeckert
*Attorney*—Robert E. Burns ABSTRACT: A novel polyamide containing in its main molecular chain a recurring structural unit of $\alpha,\omega$-alkylene hexahydro terephthalamide having the general formula,

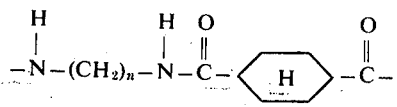

wherein $n$ is an integer of 11–13, is melt-spinnable and drawable to form fibers superior in strength, Young's modulus and dye receptivity and which possess special luster and hand. The content of the said unit in the polyamide is preferably at least 3 percent by mole. Polymers of this invention include a homopolyamide and copolyamides comprising the said unit and at least one different polyamide unit. In particular, poly ($\alpha,\omega$-alkylene hexahydroterephthalamide/$\alpha,\omega$-alkylene terephthalamide) wherein either of its alkylene group has 11–13 carbon atoms, is excellent in spinnability as well as in drawability. Polymer blend comprising the homopolyamide or copolyamide and at least one aliphatic polyamide can provide fibers with superior properties as well. Furthermore a conjugate filament consisting of the copolyamide and nylon-6, nylon-66 or a polyester is superior in elasticity, recoverability after extension, heat resistance and antistatic property.

3,629,053

NOVEL POLYAMIDE AND FIBER THEREOF

This invention relates to novel polyamides and fibers prepared therefrom and more particularly to synthetic polyamides and fibers thereof having an excellent drawability, high Young's modulus and superior heat resistivity.

Various fibers consisting of a thermoplastic synthetic linear polymer have been heretofore proposed. The most representative thermoplastic synthetic linear polymers among those are a polyamide such as poly-ε-caproamide and polyhexamethylene adipamide and a polyester such as polyethylene terephthalate. However, even fibers consisting of such a representative thermoplastic synthetic linear polymer do not possess all of the desired properties.

Namely, while polyamide fibers are superior in strength and dye receptivity, they have defects in their elastic properties such as Young's modulus, flexural rigidity and the like, heat resistance, light stability, etc. In particular, they have such a poor Young's modulus that various textile products made therefrom are generally limp due to their nonresiliency. These drawbacks are serious limitations as to utility of such fibers in the textile industry. On the contrary, polyester fibers have excellent characteristics with respect to Young's modulus, heat resistance and light stability in which properties, polyamide fibers are inferior. However, they too have certain drawbacks, i.e. a touch which is too smooth and waxy, poor covering power, low dye receptivity and the formation of pills. Numerous improvements have been attempted in the past in order to remedy these drawbacks, but which have not always led to a satisfactory result.

For instance, there have been proposed MXD-6 i.e., polymetaxylylene adipamide, Cyclamide i.e., poly-1,4-cyclohexylenedimethylene suberamide, Nomex i.e., polymetaxylylene isophthalamide, nylon-6T i.e., polyhexamethylene terephthalamide, PACM-9 i.e., polybis(paracyclohexylene)methane azelamide and the like, as polymers provided with the excellent properties of a polyamide together with those of a polyester.

However, fibers consisting of MXD-6 undergo thermal degradation to a great extent when wet and moreover involve problems in heat stability due to their inevitable discoloration. As for Cyclamide, there are some problems as to workability in the processes of polymerization and spinning due to its extremely high melting point, and the raw material for the acid component thereof is not easily available. Both Nomex and nylon-6T have high-melting points and therefore it is impossible to effect heat polycondensation, melting and spinning thereof in accordance with a conventional method; a specially designed method must be used, so that extensive utility cannot be expected of them in the textile field. Furthermore, PACM-9 (or PACM-12) can provide extremely superior fibers, although there are difficulties, in that the isolation of the stereoisomers of the alicyclic compound is required in the synthesis of its monomer, which adds to the cost of fibers.

Furthermore, many composite filaments having unique characteristics have been proposed wherein at least two different components of fiber-forming synthetic linear polymer are disposed in side by side or eccentric sheath and core relation along the entire length of the unitary filament. Namely, it has been known that the polyamide composite filament as such, one component of which consists of an aliphatic polyamide such as nylon-6 and nylon-66 and the other component of which consists of a copolyamide, develops three dimensional woollike helical crimps upon heat treatment.

The characteristics of such polyamide composite filaments which are capable of developing three dimensional crimps vary, depending to a large extent upon the nature of the copolyamide component constituting the composite filament, so that a great number of methods for improving the characteristics of composite filament has been attempted by employing various copolyamides.

For instance, for obviating a common drawback of polyamides, i.e., a low-Young's modulus, a method has been proposed to utilize a copolyamide obtained by heat polymerizing a mixture of an aromatic nylon salt consisting of diaminoalkane having eight–12 carbon atoms in its main molecular chain and terephthalic acid, with ε-caprolactam as a composite filament component, in Japanese Pat. Application Publications No. 26,849/1965 and No. 8,984/1968. The crimped composite filament manufactured according to the above mentioned method is provided with considerably improved Young's modulus and crimp elasticity, while its crimp stability and crimp recovery are not satisfactorily improved and it has insufficient heat and light stabilities due to the presence of the copolyamide. In Japanese Pat. Application Publication No. 10,180/1968, a composite filament has been proposed consisting of nylon-6 and a polymer blend of nylon-6 with a polyamide containing an alicyclic ring in its main molecular chain. The purpose of this composite is a filament of improved bonding ability with respect to the two components and of crimp developability when heat treated and further, the avoidance of problems caused by the difference in melting point between a homopolyamide and a random copolyamide. However, the drawbacks of polyamides i.e., low-Young's modulus, crimp stability and crimp recovery have not been eliminated.

We, the inventors, have carried out extensive studies and investigations on a superior polyamide which has none of difficulties mentioned above, which can be prepared in any desired viscosity without being accompanied by discoloration and which is easy to spin and draw to provide novel fibers in which the excellent properties of polyamides are combined with those of polyesters such as superior strength, Young's modulus elongation, dyeability and the like. This combination of properties has never been provided in conventional polyamide or polyester fibers, and thus we have accomplished the present invention.

It is an object of the present invention to provide a novel polyamide the viscosity of which is easily regulated during polycondensing, unaccompanied by discoloration and which has excellent spinnability as well as drawability. Another object of the present invention is to provide highly elastic polyamide fibers which are superior in properties such as strength, Young's modulus, dye receptivity and further possess peculiar luster, gloss and hand, which characteristics have never been heretofore obtained in conventional polyamide or polyester. A further object of the present invention is to provide crimped polyamide composite filament having an extremely high Young's modulus as compared with conventional composite filaments, increased crimp stability and crimp recovery and superior heat and light stabilities. A still further object is to produce a polyester-polyamide composite filament having a sheath and core structure wherein the polyamide component consists of a novel polyamide having a high-melting point, high-Young's modulus and good recovery after elongation and accordingly which composite filament is provided with higher elasticity, more superior recovery and heat stability than any conventional sheath and core type composite filaments. Other objects will appear hereinafter.

For accomplishing the above-mentioned objects, the present invention is directed initially to a fiber-forming polyamide containing in its molecular chain an α,ω-alkylene hexahydroterephthalamide unit having the following general formula:-

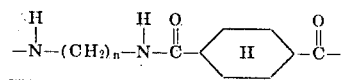

where, $n$ is an integer of 11–13.

As a polyamide comprising hexahydroterephthalic acid which will be referred to as "(H)T" hereinafter, there have been well-known polyamides consisting of hexamethylenediamine (hereinafter referred to as "6 diamine") or piperazine or its derivatives and (H)T. Any of those known polyamides have been obtained by an interface polymerization of the amines and acid chloride of (H)T: a polyamide or copolyamide obtained from (H)T itself has not been proposed in the past.

It has been discovered, in accordance with the present invention, that an homopolyamide obtained by polycondensing a polyamide forming component consisting of a α,ω-normal alkylene diamine having 11–13 carbon atoms (hereinafter referred to as "11–13 diamine") and of (H)T provides superior fibers when blended with another polyamide and a copolyamide comprising, as its structural unit, the recurring unit of the above mentioned homopolyamide. The resultant blend is melt spinnable into fibers in which the superior properties of polyamides are combined with those of polyesters.

The fiber-forming polyamide of the present invention comprises, as its recurring structural unit, α,ω-alkylene hexahydroterephthalamide having the general formula,

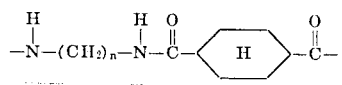

where, $n$ is an integer of 11–13. The above-described recurring structural unit is referred to as "11–13 (H)T" hereinafter.

The most important embodiment of the present invention is a homopolymer consisting essentially of 11–13 (H)T which is obtainable by polycondensing at least one α,ω-diaminoalkane selected from the group consisting of 11–13 diamines, with (H)T.

Another important embodiment of the present invention is a copolymer consisting essentially of 97–3 percent by mole of 11–13 (H)T and 3–97 percent by mole of a fiber-forming polyamide component different therefrom.

The fiber-forming polyamide components except the 11–13 (H)T employed in the present invention are obtained by polymerizing at least one polyamide forming material selected from the group consisting of ω-aminocarboxylic acids represented by ε-aminocaproic acid; lactams represented by ε-caprolactam; and nylon salts obtained from the combination of a diamine such as an α,ω-diaminoalkane; piperazine, dimethyl piperazine and N,N'- substituted ring-containing diamine derived therefrom an alicyclic diamine represented by bis(p-aminocyclohexyl) methane or the like; an aromatic ring containing diamine, e.g., m-xylylenediamine and p-xylylenediamine; with a dicarboxylic acid such as an aliphatic dicarboxylic acid, e.g., adipic acid, sebacic acid, azelaic acid, 1, 10-decane dicarboxylic acid, etc. a ring-containing dicarboxylic acid, e.g., terephthalic acid (hereinafter abbreviated as "T"), isophthalic acid and alicyclic acid obtained by hydrogenating the aromatic ring thereof. Among the polyamide components as mentioned above, preferable in the present invention are those obtained by polymerization of γ-butyrolactam, δ-valerolactam, ε-caprolactam, heptalactam,6-aminocaproic acid, 7-aminoheptanoic acid, 9-aminononanoic acid, 11-aminoundecanoic acid or a nylon salt consisting of tetramethylenediamine, pentamethylenediamine, hexamethylenediamine, heptamethylenediamine, octamethylenediamine, nonamethylenediamine, decamethylenediamine, undecamethylenediamine, dodecamethylenediamine, m-xylylenediamine, bis(γ-aminopropyl)ether, N,N'-bis(ω-aminopropyl)piperazine or 1,11-diaminoundecane, and terephthalic acid, isophthalic acid, glutaric acid, adipic acid, pimelic acid, suberic acid, azelaic acid, sebacic acid, dodecane dicarboxylic acid, hexahydroterephthalic acid, diphenylene-4,4'-dicarboxylic acid, diphenylmethane-4,4'-dicarboxylic acid or diphenylether-4,4'-dicarboxylic acid.

The copolymer comprising: a polyamide component consisting of an 11–13 diamine and T (hereinafter referred to as "11–13 T"); and another polyamide component consisting of 11–13 diamine and (H)T, that is, 11–13 (H)T, is a copolyamide in which the (H)T component is substituted for a minor or major part of T component in the 11–13 T system thereof. This copolyamide, which is referred to as 11–13T/11–13 (H)T hereinafter, has a melting point within a temperature range which is preferable for the manufacture of fiber. Moreover, 11–13T/-13(CH)T has neither a high-melting point nor a high-melt viscosity, characteristics which are usually exhibited by conventional copolymeric polyamides, so that no discoloration occurs during the manufacture of fibers. In addition to the above, the copolyamide of the present invention is homogeneous in its properties and superior in its spinnability as well as its drawability. Furthermore, the fibers comprising the copolyamide of the invention are novel fibers exhibiting prominently, excellent properties, such as Young's modulus, i.e., resiliency, tensile strength, heat resistance, gloss, luster, hand, wash and wear property, crease resistance, degrees of stiffness and softness and the like.

It is surprising indeed that the copolyamide of the present invention is provided with various superior properties as mentioned above, and that none of the copolymeric systems containing all sorts of diamine dicarboxylic acids comprising a dicarboxylic acid other than (H)T has lead to fibers, having properties as superior as those of the present invention. The reason for this is still not clear at present but is thought to relate to the similarity in conformation of T and (H)T.

It is the most important feature of the aforementioned copolyamide of the present invention that aromatic and alicyclic rings have been introduced into the main molecular chain thereof. The introduction of aromatic rings serves to provide improvements of Young's modulus and heat resistance of the copolymer, while the introduction of alicyclic rings not only serves to provide improvements of Young's modulus and heat resistance as well, but also contributes to provide fibers from the copolyamide with improved drawability and recovery after elongation as a result of the provision of softness to the polymer molecules.

Alicyclic polyamides have scarcely been utilized heretofore, due to their generally high melting points, as compared with aromatic polyamides; however, they are now effectively utilizable by copolycondensing with 11–13 T according to the present invention. Particularly, copolymers of 11–13 T with 11–13 (H)T as mentioned before are usable in a wide range of copolymerization ratios and are most useful in the present invention. The copolyamides 11–13 T/11–13 (H)T according to the present invention never exhibit melting points as low as those of conventional copolyamides within the aforesaid copolymerization ratio and all of them have melting points and softening points higher than nylon-6.

As the combination of copolymeric components for the copolymer of 11–13 T/11–13 (H)T in the present invention, mention may be made of the following nine modes:-

| 11 T/11 (H)T, | 11 T/12 (H)T, | 11 T/13 (H)T, |
| 12 T/11 (H)T, | 12 T/12 (H)T, | 12 T/13 (H)T, |
| 13 T/11 (H)T, | 13 T/12 (H)T, | 13 T/13 (H)T, | where, the integers denote the number of carbon atoms in the diamine. Among the above, specifically preferable are those wherein the diamine components have the same number of carbon atoms in both components of the copolymer such as 11 T/11 (H)T, 12 T/12 (H)T and 13 T/13 (H)T.

As long as the amount of the polyamide component consisting of 11–13 diamine and (H)T is 97–3 percent by mole in the copolymer of the present invention, the copolymer may be a terpolymer or a copolymer of more than three comonomers.

Furthermore, the (H)T applied to the present invention may have any stereo structure.

Thus, it is very advantageous that it may consist of 100 percent of cis-form, of 100 percent of trans-form or of mixture of those two isomeric forms, because during the process of the heat polycondensation of 11–13 (H)T salt, all isomeric forms thereof are converted to the trans-form. Such a phenomenon has never been discovered before the accomplishment of the present invention.

In the manufacture of the polyamide fibers of the present invention, the processes are substantially the same as conventional ones. Namely, raw materials, i.e., a diamine selected from 11–13 diamines and (H)T are reacted with each other in a equivalent amount to obtain a nylon salt. To a predetermined amount of at least one nylon salt consisting of different polyamide forming components, a lactam of an ω-aminocarboxylic acid is further added. Those salts or polyamide forming materials in powdery form, purified and dried are added with water, if required, and heated to form a solution or slurry which is then charged into autoclave where the polycondensation reaction is carried out at elevated temperature under a predetermined pressure for a predetermined period. During the polycondensation reaction, agitation may be effected to facilitate a homogeneous reaction. In the event that the polycondensation is performed in an aqueous system, the inside pressure in general is preferably set so as to be at least 15 Kg./cm.$^2$ at the beginning of polycondensation. The inherent viscosity [η] of the polymer to be obtained should be at least 0.7 preferably 0.8–1.2 in order to comply with the intended utility of the fibers to be produced therefrom.

In order to provide the required conditions for the polycondensation reaction, various viscosity regulating agents such as monocarboxylic acids, dicarboxylic acids, monoamines and diamines are employable. If diamines are used, the resultant polymer has more amino terminal groups so that its dye receptivity to acidic dyes is increased.

In addition to the above, inorganic or organic substances such as delustrants, pigments, dyes, light stabilizers, fluorescent whitening agents, heat stabilizers, plasticizers, antistatic agents and the like may be added before or during the polymerization.

Thus, after completion of the polycondensation reaction, the obtained copolymer is defoamed and may be extruded from the bottom of the autoclave in the form of a band which is pelletized, dried and supplied into an extruder for spinning, or it may be directly extruded from the nozzles mounted on the bottom of the autoclave to form filaments. In either case, it is preferred to shield the environment right below the nozzles with inert gas and to heat the space of about 1–2 meters below the nozzles at a temperature of 150°–300° C. to minimize the so-called effect of spinning draft, as has been known heretofore, when a polymer having comparatively high melting point and high-melt viscosity is melt-spun. Freshly spun yarn taken up on a bobbin is usually subjected to a hot drawing process where it is drawn on a snubbing pin or roller heated at 80°–170° C. and further set by being passed on a plate heated at 60°–200b$L$ C. under an unstretched state.

Thus obtained polyamide fibers of the present invention possess a tensile strength at break and an elongation at break as excellent as ordinary polyamide fibers, a boiloff shrinkage as low as polyester fibers and Young's modulus greater than nylon-6 and nearly equal to polyester fibers. Further, it has been clarified that the fibers of the present invention as well as fabrics woven therefrom are far superior to those of ordinary nylon-6 or nylon-66 and sometimes to those of polyester, in recovery angle of set flexure, crease-resistance and degree of stiffness and softness which are in close relation to their wash and wear property.

Still further, one of the outstanding features of the polyamide fibers of the present invention is that they are not fragile which is often the case with aromatic polyamide fibers; the present fibers are characteristically tough. Besides, the polyamide fibers of the present invention have extremely increased gloss and luster, and thus exhibit a unique aesthetic effect, so that fabrics woven therefrom display gorgeous hand and feeling.

The cross-sectional configurations of the fibers of the invention can be readily formed into shapes having very sharp edges or lobes. Heterofilaments or cut staples as such can be blended with different polyamide fibers, polyester fibers or natural fibers to weave or knit into fabrics for textile products having unique hand and feeling. In addition to the above, the polyamide fibers of the present invention are also applicable to industrial use, e.g., for tire cords.

Another important embodiment of the present invention is polymer blends or fibers thereof. By blending the homopolyamide of 11–13 (H)T or the copolyamide obtained from nylon salts 11–13 T and 11–13 (H)T with at least one aliphatic polyamide, a modified fiber-forming polyamide of good quality is obtainable. Namely, in order to attain the best result, the polymer blend should consist essentially of 97–3 percent by weight of an 11–13 (H)T homopolyamide or of a copolyamide obtained by copolycondensing 10–97 percent by mole of 11–13 T nylon salt with 90–3 percent by mole of 11–13 (H)T nylon salt, and 3–97 percent by weight of at least one aliphatic polyamide.

The aliphatic polyamides constituting the polymer blend of the present invention are those comprising predominantly a polymerization product of: a lactam such as ε-caprolactam, enantholactam, laurylolactam and the like; an aliphatic ω-monoamino-monocarboxylic acid having six–13 carbon atoms such as ε-aminocaproic acid, ω-aminododecanoic acid and the like; or a nylon salt consisting of an aliphatic diamine having four–13 carbon atoms and aliphatic dicarboxylic acid having six–13 carbon atoms.

The novel modified fiber-forming polyamide is obtained, as mentioned above, by melt-blending a ring-containing homopolyamide or copolyamide having superior properties with aliphatic polyamides and its blending proportion is preferably such as described before, 3–97 percent by weight of aliphatic polyamide and 97–3 percent by weight of homo- or copolyamide of the present invention, and more preferably 5–95 percent by weight of the former and 95–5 percent by weight of the latter.

The polymer blends having a blending proportion in the foregoing ranges will readily provide fibers having high Young's modulus and superior heat resistance, drawability and recovery after extension and further having satisfactory dye receptivity. If the blending amount of the aliphatic polyamide is in excess of 97 percent by weight, the fibers consisting of such polymer blend will be provided with substantially the same properties as those of conventional aliphatic polyamides, when the amount of the aliphatic polyamide is less than 3 percent by weight, the resultant fibers will have less superiority in drawability, recovery after extension and dye receptivity which are most advantageous characteristics of aliphatic polyamides.

The melt blending of the above mentioned aliphatic polyamide with the ring-containing homo- or copolyamide can be conducted in an ordinary autoclave equipped with an agitator or can be effected by kneading in an ordinary extruder at 250°–350° C. for 5–40 minutes. Since a too highly elevated temperature or too prolonged period in the kneading process causes an amide-interchange reaction between the aliphatic polyamide and the ring-containing copolyamide resulting in a random copolymer, it should be avoided.

The fibers consisting of the polymer blend of the present invention may be manufactured by melt-spinning of chips which have been obtained in advance by kneading the aliphatic polyamide and the copolyamide in an extruder or by directly spinning blended melts of two polyamides. In the fiber of a polymer blend, either polyamide may exist in the form of needlelike microfibrils oriented in the longitudinal direction of the fiber or of continuous microfibers, or two polyamides may react upon each other at terminals of their molecules, forming a block copolymer.

As mentioned before, the fibers of a polymer blend may be incorporated with additives such as delustrants, pigments, heat stabilizers, light stabilizers and the like.

The processes and apparatuses for drawing the fibers of polymer blend of the invention require nothing special and a cold-drawing at room temperature or a hot-drawing at 60–150° C. will provide fibers having sufficient tensile strength.

The fibers made of a polymer blend of the present invention consisting of an aliphatic polyamide having drawbacks in its Young's modulus as well as heat resistance and of a novel highly elastic homo- or copolyamide have high-Young's modulus, excellent heat resistance, good recovery after extension, improved drawability and increased dye receptivity. Further the fibers of the invention have utilities in wide fields, as continuous filaments and cut staples, providing woven fabrics, fabrics made of textured yarn, knitted fabrics, pile fabrics and industrial fibrous materials. Moreover, the fibers of polymer blends of the present invention are effectively applicable for textile use, because they are capable of diminishing the electrification phenomenon under low humidity to a considerable extent; this phenomenon is inherent in conventional synthetic fibers.

Still another embodiment of the present invention is a novel crimpable composite filament having at least two components in eccentric relationship across the filament, one component being a synthetic linear polymer selected from the group consisting of polyesters predominantly comprising polyethylene terephthalate and polyamides predominantly comprising poly-ε-caproamide or polyhexamethylene adipamide and as another component eccentric to and continuous with said first component, a copolyamide consisting of 11–13 T and 11–13 (H)T; this composite filament has high elasticity, superior recovery after extension and excellent heat resistance. In the composite filament of the present invention, the said copolyamide preferably consists of 20–97 percent by mole of 11–13 T and 80–3 percent by mole of 11–13 (H)T, and the melting point of the copolyamide is preferably higher than that of the first component with which it is conjugated. When the first component consists of polyamide, the arrangement of the two components in the cross section of the filament may be either of eccentric sheath and core relation or of side by side relation. When the first component is a polyester, the arrangement should be of eccentric sheath and core relation.

Polyamides having alicyclic rings in their main molecular chain have a Young's modulus as high as that of polyamides having aromatic rings and higher than that of aliphatic polyamides, and nevertheless they have heretofore had less utility due to their high-melting point in comparison with aromatic polyamides.

However, the copolyamide constituting a part of the composite filament of the present invention is a highly elastic copolymer obtained by copolycondensing an alicyclic nylon salt 11–13 (H)T with an aromatic nylon salt 11–13 T as mentioned above; this copolymer has a relevant melting point suitable for application of the copolymer for practical use, within a wide range of copolymerization ratio. Moreover, it is a feature of the invention that the variation of the copolymerization ratio does not cause a reduction of crystallinity and of Young's modulus of the copolyamide; any copolyamide in an extremely extended range of copolymerization ratio is utilizable; whereas, the copolymerization ratio of conventional copolyamides are limited to a rather narrow range.

The preferable ratio of the aromatic structural unit 11–13 T and the alicyclic structural unit 11–13 (H)T in the copolyamide of the invention is, as described before, in a wide range, i.e., 20–97 percent by mole of 11–13 T and 80–3 percent by mole of 11–13 (H)T, and it can be selected appropriately within the above range. In the event that the copolymerization ratio is outside the above range, the resultant copolymer will have a melting point which is so high that the utility thereof is lost.

The copolyamide consisting of 11–13 T and 11–13 (H)T at a copolymerization ratio within the above mentioned range has a melting point and a softening point respectively higher than those of ordinary polyamides, so that it can provide a composite filament with superior heat resistance. Furthermore, the copolyamide constituting a part of the composite filament of the present invention may be provided with softness without lowering its crystallinity, by introducing alicyclic rings thereinto and accordingly it can be formed into fibers having improved drawability as well as superior recovery after extension. Therefore, the composite filament of the present invention comprising a polyamide such as nylon-6 and nylon-66 or a polyester such as polyethylene terephthalate, and as another component eccentric to and continuous with said first component, the above-mentioned copolyamide, has a crimp stability and a crimp recovery as excellent as those of wool.

Thus, the discovery of the superiority of the copolyamide consisting of 11–13 (H)T and 11–13 T, as a component of a composite filament, has made 11–13 (H)T applicable as a very effective comonomer of the composite filament of the present invention.

A preferable conjugate ratio of nylon-6 or nylon-66 to the copolyamide is in the range of 9:1–1:9.

Moreover, the copolyamide comprising the composite filament of the present invention is quite different in molecular structure and crystallinity from ordinary polyamides such as nylon-6, nylon-66 and the like, and has extremely high elasticity. Besides, the copolyamide is electrified by friction so as to have a negatively charged voltage and accordingly in the composite filament, wherein the copolyamide of the invention and nylon-6, nylon-66 or other ordinary polyamides having positive static charge on friction are bonded to each other, static charges generated by friction on the respective polyamide components are neutralized, so that the composite filament of the invention is provided with an outstanding effect, in preventing static electrification.

In the present invention the polyester component to be conjugated to the copolyamide consists predominantly of polyethylene terephthalate or of a copolymer of at least 90 percent by weight of polyethylene terephthalate and at most 10 percent by weight of a polyester different therefrom such as polyethylene isophthalate, polytetramethylene terephthalate, polyethylene hexahydroterephthalate, polyethylene oxybenzoate or the like.

The disposition in the cross section of a unitary filament, of the above mentioned polyester and copolyamide components constituting the composite filament of the present invention may be in either concentric or eccentric sheath and core relationship. The copolyamide may be a core component or a sheath component. A conjugate ratio, i.e., the ratio by weight of two components in the composite filament, is preferably in the range between 9:1 and 1:9, in order to provide the composite filament with properties of the both components.

The cross-sectional configuration of the composite filament of the present invention may be either circular or noncircular.

Thus, the composite filament of the present invention consisting of nylon-6, nylon-66 or a polyester and a copolyamide which is a polycondensation product of an aromatic nylon salt of 11–13 T and an alicyclic nylon salt of 11–13 (H)T, having a high-melting point suitable for practical utility in and over a wide range of its copolymerization composition, is superior in elasticity and in recovery after extension and further possesses good heat resistance and antistatic property. It is utilizable in the form of continuous filaments or cut staples in a wide field, for various woven fabrics, knitted fabrics, pile fabrics, upholstery and industrial materials.

The present invention will be illustrated in more details in the following examples. Measurements or determinations of various properties of polymers or fibers appearing in examples are as follows:

1. Recovery angle of set flexure.

A filament sample which has been conditioned at 20° C. in 65 percent R.H. is bent by 180° on a knife edge and loaded for 2 minutes with a weight corresponding to 0.05 g./denier. The filament was allowed to recover, after removal of the load, under a tensionless condition and the angle of flexure of the filament is measured.

2. Crease resistance.

Crease resistance is measured by the tentative method designated in ASTM-D-1295-60T or in JIS-L-1079 5.22.2 as follows:

Respective 10 pieces, 1 cm. wide and 4 cm. long are taken from a fabric in its warp and weft directions. The specimens are held between metal plates for the Monsanto-type tester and portions of the specimen projected out of the shorter upper plate are folded back so that five pieces are folded up face to face with themselves and the remaining five pieces are back to back. These specimens are placed on a press holder, loaded for 5 minutes with a weight of 500 g. and after removal of the load, the specimen holder is shifted with care into a holder on the tester. The rotatory plate of the tester is rotated for 5 minutes so that the hanging portion of the specimen may be always in accordance with the perpendicular at the center of the tester and whereafter an opening angle of the specimen is measured ($a$, in degree). The crease resistance is calculated by the following equation:

Percent crease resistance $=\alpha/180 \times 100$

An average of each 10 measurements with respect to the warp and weft directions is adopted.

3. Degree of stiffness and softness.

The degree of stiffness and softness is measured by the tentative method designated in JIS-L-1079 5.17 as follows:

Five pieces of $l$ cm. long and $d$ cm. wide are taken from a fabric respectively in its warp and weft directions, and one piece is chucked on the Gurley's stiffness tester. The chuck is brought into accordance with the graduation $l/2.54$ on the movable arm and fixed thereupon. Next, hanging appropriate weights $W_a$ (g.), $W_b$ (g.) and $W_c$ (g.) respectively from apertures $a$, $b$ and $c$ below the fulcrum of the pendulum B, the movable arm is rotated at a constant speed and when the specimen parts from the pendulum the graduation $R_G$ is read. The degree of stiffness and softness is calculated by the following formula:

Degree of stiffness and softness (mg.) $=R_G \times (aW_a+bW_b+cW_c) \times l^2/d \times 0.306$ where, $a$, $b$ and $c$ are respectively distances (in cm.) between the apertures and the fulcrum.

Averages of measurements for the respective face and back sides of specimen should be obtained with respect to both warp and weft direction.

4. Strength retention after heating.

A drawn yarn is treated for 20 minutes in a nitrogen gas atmosphere heated at 200° C., under relaxed condition and the strength retention after heating (%) is given by percentage of tensile strength at break after the treatment against that before the treatment.

5. Voltage of charge.

Using a frictional electrification tester manufactured by Kasuga Denki K.K., a drawn yarn which has been stripped of monomers as well as oiling agents is run at a speed of 100 m./min. and the voltage (V) generated is read.

6. Melting point of polymer.

The melting point of a polymer is measured according to differential thermal analysis.

7. Recovery after extension.

A drawn yarn of 4 cm. long is stretched by 5 percent of its original length at a rate of 5 mm./min., maintained at its stretched state for 1 minute and recovered at the same rate as above. The recovery after extension is given by a percentage of the length of contraction against the length of extension.

8. Dye receptivity.

1 g. of drawn yarn is soaked in a dye bath containing 0.02 g. of Coomassie Ultra Sky SE (the trade name of acidic dye manufactured by I.C.I.Ltd.) dissolved in 100 ml. of distilled water added with a couple of drops of glacial acetic acid, which is heated until the temperature reaches 95° C., requiring 30 minutes, at which temperature the bath is kept for another 30 minutes. The dye receptivity is represented by a percentage of dye consumption.

9. Extensibility and recoverability of a textured yarn.

The crimped textured yarn is formed into a skein of 1,000 denier, which is soaked for 10 minutes in boiling water and thereafter dried in air. The extensibility and the recoverability of the yarn are calculated by the following equations:

Percent extensibility $=L_1-L_0/L_0 \times 100$
Percent recoverability $=L_1-L_2/L_1-L_0 \times 100$ where, $L_0$ is the length of the skein after being loaded for 1 minute with an initial weight corresponding to 20 mg./denier, $L_1$ is the straightened length of the skein after being loaded for 1 minute with a weight corresponding to 200 mg./denier and $L_2$ is the length of the skein which has been allowed to recover for one minute after replacing the second weight by the initial weight.

10. Crimpability.

Thirty ends of a drawn composite filament of 30 cm. long is made into a bundle of filaments. The bundle is loaded with a weight corresponding to 0.1 mg./denier and soaked for 10 minutes in boiling water to develop crimps. The crimped filament bundle is then air-dried while loaded, and the crimpability is given by a percentage of shrinkage against the original length.

11. Crimp elasticity.

The crimp elasticity is represented by a weight (mg./denier) required for 20 percent elongation of the filament bundle having been loaded with a weight of 0.1 mg./denier, after determination of the crimpability as mentioned above.

12. Crimp recovery after extension.

The filament bundle after the above mentioned determination of crimpability is loaded with a weight corresponding to 0.2 mg./denier and the length of the bundle is measured ($l_0$). The bundle is then loaded for one minute with a weight corresponding to 0.1 g./denier and the length of the bundle is measured ($l_1$). The bundle is allowed to recover, after removal of the latter load only, for 2 minutes and the length of the bundle is again measured ($l_2$).

The crimp recovery after extension is calculated by the following equation:

Percent crimp recovery after extension
$=L_1-L_2)/(L_1-L_0) \times 100$

In the examples parts, percentages and proportions are by weight unless otherwise indicated.

EXAMPLE 1

Five kg. of 11 diamine were added to 25 liters of water while agitating the mixture, 4.4 kg. of T were further added thereto and the mixture was agitated for 30 minutes at 98° C. resulting in a homogeneous solution. A small amount of T is added to the solution so as to bring its pH at 96° C. to 6.6. When this aqueous solution was cooled, then white crystals of 11 T salt were precipitated, which were separated by means of a centrifugal separator.

On the other hand, dimethyl terephthalate was dissolved in methanol, hydrogenated using a Raney nickel catalyst and hydrolyzed with alkali to prepare (H)T. The obtained (H)T consisted of 79 percent of transform isomer and 21 percent of cis-form isomer.

One kg. of 11 diamine was added to 3 liters of water, and heated to 98° C.; 0.9 kg. of (H) was gradually added and dissolved thereinto. After the mixture turned to a homogeneous solution, a small amount of (H)T was further added thereto to bring its pH at 96° C. to 6.9. The thus prepared aqueous solution was poured into 20 liters of isopropanol at room temperature under agitation and then white crystals of 11 (H)T salt were precipitated which were thereafter filtered off and washed thoroughly with isopropanol.

The thus prepared 11 T and 11(H)T nylon salts were both dried sufficiently. Three kg. of 11 T salt, 0.54 kg. of 11 (H)T salt, 15 g. of titanium dioxide and 9.3 g. of 11 diamine were put into 4 kg. of water and dissolved thereinto by heating under agitation. The solution was transferred to a 10 liter autoclave previously purged with nitrogen gas. After closing the valves, the solution was heated until the inner temperature reached 230° C., requiring 1.5 hours. The heating was further continued until the inner temperature reached 290° C. requiring 3.5 hours, while bleeding off steam through a valve, to maintain an inner pressure of 19 kg./cm². Then the pressure was restored to atmospheric pressure requiring 1.5 hours and nitrogen gas was passed into the autoclave for 30 minutes while agitation of 30 revolutions per minute was continued. During the reaction at atmospheric pressure, an inner temperature of 300° C. was reached. After stopping the agitation, the pressure was reduced gradually to 300 mm.Hg of absolute pressure requiring 2.5 hours, maintained its pressure for 30 minutes and then nitrogen gas was introduced into the autoclave to restore it to atmospheric pressure. After standing for 30 minutes the polymer was extruded continuously by the aid of a nitrogen back pressure of 3 kg./cm² from a spinneret provided with orifices having diameters of 5 mm. and mounted at the bottom of the autoclave, in the form of band, and was then quenched with water and cut into chips of 3 mm. long. The chips were dried for 15 hours at 80° C. under a reduced pressure of 1 mm.Hg.

The obtained polymer had a melting point of 270° C. and an inherent viscosity [η] of 0.92 which was measured at 30° C. in m-cresol solvent. It possessed 53.5 meq. per kilogram of polymer, of amino terminal groups.

Using a screw extruder having an inner diameter of its barrel of 20 mm. the above-obtained dried chips were melt-extruded at a cylinder temperature of 290° C. and at a spinneret temperature of 310° C., into a nitrogen gas environment at 200° C. formed from the spinneret plate surface to 1.5 meters below the spinneret and a freshly spun filament yarn of 230 denier of 18 filaments was wound up on a bobbin.

The undrawn yarn was hot drawn to 3.58 times its original length on a draw pin heated at 100° C. and passed over a heated plate at 150° C. Using the thus obtained drawn yarn, a taffeta having a warp density of 50/cm. and a weft density of 25/cm. was woven.

Besides the above, as comparative samples, respective filaments were obtained by melt-spinning: nylon-6 having an inherent viscosity [η] of 1.2 in m-cresol at 30° C. which had been manufactured in a commercial plant; polyethylene terephthalate (hereinafter referred to as "PET") having an inherent viscosity [η] of 0.64 in o-chlorophenol at 30° C.; and a copolycondensation product of 18 percent by mole of 11 T salt and 15 percent by mole of ε-caprolactam (hereinafter referred to as "CL"). Those filaments were woven into respective taffetas.

The properties of these filaments as well as taffetas made therefrom will be given in table 1 which follows:

1, and the polymer was extruded in a form of band which was thereafter cut into chips. The obtained polymer had a melting point of 268° C. and an inherent viscosity [η] in m-cresol at 30° C. of 1.0.

These chips were subjected to a melt-spinning process in the same manner and under the same conditions as in example 1. The obtained undrawn yarn was hot-drawn to 3.47 times its original length on a pin heated at 100° C., rolls at 100° C. and a heated plate at 150° C. The resultant yarn of 69.7 denier of 18 filaments had a tensile strength at break of 4.31 g./denier, an elongation at break of 21.2 percent, a Young's modulus of 49.3 g./denier, a hot water shrinkage of 8.4 percent and a recovery angle of set flexure of 118°. Using the above obtained yarn, a tricot having a back half texture was knit under conditions of wales of 28 gauge and 53 courses per inch. The obtained article was so resilient that it was hardly creased.

EXAMPLE 3

Five kg. of 1,12-dodecamethylene diamine i.e., 12 diamine were added to 90 liters of water and agitated. After further adding 4.15 kg. of T, the mixture was heated at 98° C. and agitated until a homogeneous solution was obtained. When the solution was cooled, white crystals of 12 T salt were precipitated which were separated by means of a centrifugal separator and dried.

On the other hand, 1 kg. of 1,13-tridecamethylene diamine i.e., 13 diamine was added to 3 liters of water, and 0.8 kg. of (H)T of 100 percent cis-form (hereinafter referred to as "(H)$_c$T") was further added gradually thereinto, heating the solution at 98° C. to dissolve (H)$_c$T to obtain a homogeneous solution to which was still further added a small amount of (H)$_c$T to bring its pH at 96° C. to 6.8. The prepared aqueous

TABLE 1

| Yarn sample | Filament | | | | | | | Taffeta | | |
|---|---|---|---|---|---|---|---|---|---|---|
| | Fineness (denier) | Tensile strength at break (g./d.) | Elongation at break, percent | Young's modulus (g./d.) | Shrinkage in boiling water, percent | Dye receptivity,* percent | Recovery angle of set flexure (degree) | Crease resistance, percent | | Degree of stiffness and softness (mg.) |
| | | | | | | | | Dry | Wet percent | |
| This invention | 71.7 | 4.56 | 18.8 | 51.2 | 7.5 | 65.7 | 130 | 79.4 | 77.6 | 90.3 |
| Nylon-6 | 68.8 | 4.74 | 30.5 | 18.6 | 18.1 | 78.4 | 85 | 77.3 | 68.7 | 45.8 |
| PET | 7.37 | 4.37 | 19.8 | 97.1 | 8.4 | 0 | 60 | 79.3 | 77.3 | 76.7 |
| 11T/CL | 71.4 | 4.41 | 18.6 | 38.3 | 16.6 | 68.2 | 75 | 78.2 | 76.5 | 80.4 |

* Dyed for 105 minutes at 98° C in a bath containing 3% of Coomassie Ultra Sky SE 150 and added with acetic acid.

It is clearly observed from table 1 that the filament of the present invention has a tensile strength at break and elongation at break almost same as those of nylon-6 and PET which are representative synthetic fibers, an acidic dye receptivity almost equal to that of nylon-6 and a Young's modulus much higher than that of nylon-6. Moreover, it exhibits the greatest recovery angle of set flexure among those of all other conventional filaments and is superior in crease resistance and the so-called wash and wear property. In particular, the filament of the invention has a much improved Young's modulus, hot water shrinkage, and fabrics made therefrom have highly improved resiliency of and wash and wear property, as compared with 11 T/CL filament. It is the most prominent feature of the polyamide fibers of the present invention that there is no degradation of physical characteristics of fibers of the invention, whereas the physical characteristics of fibers consisting of a conventional copolymer tend to deteriorate.

EXAMPLE 2

1.06 kg. of 11 T salt and 2.5 kg. of 11 (H)T salt which had been prepared in example 1, 15g. of titanium dioxide and 9.4 g. of 11 diamine were incorporated into 4 kg. of water and the mixture was heated to form a homogenous solution. The solution was transferred into a 10 liter autoclave previously purged with nitrogen gas, where a heat polycondensation reaction took place under conditions the same as in example solution was poured into 30 liters of isopropanol at room temperature under agitation and then white crystals of 13 (H)$_c$T salt were precipitated which were thereafter filtered off, washed thoroughly with isopropanol and dried.

2.59 kg. of 12 T salt, 0.91 kg. of 13 (H)$_c$T salt thus obtained, 15 g. of titanium dioxide and 10 g. of 12 diamine were put into 4 kg. of water and dissolved thereinto by heating under agitation. The solution was transferred to a 10 liter autoclave previously purged with nitrogen gas, where a heat polycondensation was effected in the same manner as in example 1 with the exceptions of an internal pressure of 22 kg./cm². at the initial polymerization stage and a maximum temperature of 310° C. during the reaction under atmospheric pressure. The polymer was discharged by pressurizing the autoclave using nitrogen gas and extruded from the bottom of the autoclave as a band which was then quenched, cut to chips and dried. The copolymer chip had a melting point of 280° C. and an inherent viscosity [η] in m-cresol at 30° C. of 0.98.

Using the screw extruder same as used in example 1, the above-obtained dried chips were melt-extruded at a cylinder temperature of 300° C. and at a spinneret temperature of 320° C., into nitrogen gas environment at 250° C. formed from the spinneret plate surface to 1.5 meters below the spinneret and a freshly spun filament yarn of 220 denier of 18 filaments was wound up on a bobbin. The yarn was hot drawn to 3.32 times its original length on a draw-twister under the same conditions as in example 2. The resultant yarn of 72.0 denier of 18 filaments had a tensile strength at break of 3.9 g./denier, elongation at break of 23.1 percent, a Young's modulus of 46.5 g./denier and a recovery angle of set flexure of 105°.

A taffeta made from the above obtained drawn yarn under the same conditions as those of example 1, had a crease resistance when dry of 78.6 percent, while wet of 76.2 percent, a degree of stiffness and softness of 88.3 mg. and an extremely high resiliency, so that it was hardly creased and clearly provided with wash and wear properties. The woven fabric was dyeable with acidic dye into a clear shade.

EXAMPLE 4

Using the 11 T/11 (H)T copolyamide filament prepared in example 1, a stuff-in-box textured crimped yarn was manufactured with a stuffer made by Bancroft Co. Ltd., under conditions of: a heater temperature of 420° F.; a yarn winding speed of 340 m./min.; a revolution number of the yarn feed roll of 4,400 r.p.m. a roll loading pressure of 3 lbs.; and an insert of 9.5 inches. As samples for comparative tests, use were made of nylon-6, PET and 11 T/CL which had been used in example 1. The respective textured crimped yarns were obtained from these comparative samples in the same manner as above with the exceptions that a heater temperature of 340° F. for nylon-6 and that of 430° F. for PET were used.

Each 8 g. of the textured yarns of the four kinds were cut to 50 cm. ends which were loosen and put into a cylindrical container having a diameter of 10 cm. Using an automatic volume elasticity tester, they were subjected to a compression and recovery repeating process with a load of 500 g., and a degree of compression and a degree of recovery which will be shown in table 2, were calculated by the following equations:

Degree of compression (%) = $(a-b)/(a) \times 100$
Degree of recovery (%) = $(c-b)/(a-b) \times 100$ where, $a$ is the height (in cm.) of the sample mass when applied with an initial load, $b$ (in cm.) is the height when compressed under a constant load and $c$ (in cm.) is the height, after removal of the load and recovery of the mass.

TABLE 2

| Freq. of compression | Item, percent | | | | | |
| --- | --- | --- | --- | --- | --- | --- |
| | Degree of compression | | | Degree of recovery | | |
| | 10 | 20 | 70 | 10 | 20 | 70 |
| Sample: | | | | | | |
| This invention | 1.8 | 4.2 | 23.5 | 100.0 | 94.5 | 65.0 |
| Nylon-6 | 20.5 | 31.0 | 38.7 | 79.2 | 45.7 | 41.9 |
| PET | 8.1 | 15.2 | 25.2 | 100.0 | 97.5 | 85.2 |

The 11 T/CL copolyamide yarn could not be loosened into individual filaments due to the sticking of filaments to each other, so that a textured yarn of good quality was not obtainable.

From the above mentioned results it was clarified that the textured crimp yarn made from the yarn of the present invention had extremely high resiliency and high bulk.

EXAMPLE 5

Five kg. of 13 diamine were added to 90 liters of water and after stirring, 3.88 kg. of T were added thereto. The mixture was heated at 98° C. while being stirred, to provide a homogeneous solution. When the solution was cooled, white crystals of 13 T salt were precipitated which were then separated by means of a centrifugal separator and dried. On the other hand, using an (H)T consisting of 100 percent of transform isomer (hereinafter referred to as "(H)$_t$T"), 13 (H)$_t$T salt was prepared. Further, from 1 kg. of bis-γ-aminopropyl piperazine (hereinafter referred to as "N") and 0.73 kg. of adipic acid (hereinafter referred to as "A"), a NA salt was prepared through a water-isopropanol system i.e., the solvent-nonsolvent system, 3.08 kg. of the 13 I salt, 0.36 kg. of the 13 (H)$_t$T salt and 0.06 kg. of the NA salt thus obtained were incorporated to 4 kg. of water together with 15 g. of titanium dioxide and 30 g. of 10 percent aqueous solution of acetic acid. After dissolving the mixture by heating and agitating, the solution was transferred to a 10 liter autoclave previously purged with nitrogen gas, where a heat polycondensation was effected in the same manner as in example 1 with the exception of a maximum temperature of 290° C. during the reaction under atmospheric pressure. Next then, through a gear pump, filters and a spinneret connected with the bottom of the autoclave, the polymer maintained at its melting temperature of 290° C. is extruded to form an undrawn filament yarn of 240 denier of 18 filaments which was wound up on a bobbin. The environment between the spinneret and 1 meter below the spinneret was formed of nitrogen gas heated at 180° C. during the extrusion.

The obtained undrawn yarn was hot drawn to 3.6 times its original length on a roll of a draw-twister heated at 100° C. and immediately contacting with a plate heated at 150° C., and wound up on a pirn. The resultant yarn of 72.1 denier of 18 filaments had a tensile strength at break of 4.3 g./denier, an elongation at break of 20.4 percent, a Young's modulus of 48.8 g./denier, a hot water shrinkage of 9.5 percent, an acidic dye receptivity of 80.4 percent and a recovery angle of set flexure of 114°.

EXAMPLE 6

Five kg. of 11 diamine were added to 15 liters of water and heated to 98° C., 4.5 kg. of (H)T consisting of 52 percent of (H)$_t$T and 48 percent of (H)$_c$T were gradually added and dissolved thereinto. To the thus obtained homogeneous solution was further added a small amount of (H)T so as to bring the pH of the solution at 96° C. to 6.9. The solution was poured into 100 liters of isopropanol stirring at room temperature and then white crystals of 11 (H)T salt were precipitated, which were filtered off from the motor liquid and washed thoroughly with isopropanol. The obtained pure white crystal of nylon salt showed two melting points at 180° C. and 205° C.

Three kg. of 11 (H)T salt sufficiently dried, 13 g. of titanium dioxide and 7.9 g. of 11 diamine were incorporated and put into 3.4 kg. of pure water and after having dissolved the mixture by heating and disturbing, the solution was transferred to an 8 liter autoclave previously purged with nitrogen gas. The solution was heated until the inner temperature reached 230° C., requiring 1.5 hours. The heating was further continued until the inner temperature reached 315° C. requiring 3.5 hours, while bleeding off steam through a valve, to maintain an inner pressure of 22 kg./cm$^2$. Then the pressure was restored to atmospheric pressure requiring 1.5 hours and nitrogen gas was passed for 30 minutes. During the reaction at atmospheric pressure, an inner temperature of 320° C. was maintained. Then the pressure was reduced gradually to 300 mm.Hg of absolute pressure requiring 2.5 hours, the pressure was maintained as it was, for 30 minutes and then nitrogen gas was introduced into the autoclave to restore atmospheric pressure. After standing for 30 minutes the polymer was extruded continuously by pressurizing the autoclave using nitrogen gas at a back pressure of 3.5 kg./cm$^2$, from a spinneret provided with orifices having diameters of 5 mm. and mounted at the bottom of the autoclave, in the form of band, which was then cut into 3 mm. chips. The chips were dried for 24 hours at 80° C. under a reduced pressure of 1 mm.Hg.

The obtained polymer had a melting point of 300° C., an inherent viscosity [η] of 1.01 which was measured at 30° C. in m-cresol solvent, and 40.1 meq. per kilogram of polymer, of amino terminal group.

Using a screw extruder having an inner diameter of its barrel of 20 mm., the above obtained dried chips were melt-extruded at a cylinder temperature of 310° C. and at a spinneret temperature of 320° C., into nitrogen gas environment at 250° C. formed from the spinneret plate surface to 1.5 meters below the spinneret and a freshly spun filament yarn of 255 denier of 32 filaments was wound up on a bobbin.

The undrawn yarn was hot drawn to 3.51 times its original length on a draw pin and a roll, both heated at 130° C. and passing over a plate heated at 160° C.

Besides the above, as a comparative sample, by mixing 74.2 percent by mole of 11 T salt which was a reaction product of equimolar amounts of 11 diamine and T with 25.8 percent by mole of ε-caprolactam, by subjecting the mixture to a heat polycondensation reaction under the same conditions as the above and by melt-spinning the resultant polymer and hot-drawing the spun yarn under the same conditions as the above, a drawn yarn was obtained. These samples had the properties given in the following table 3.

TABLE 3

| Sample | Fineness (d.) | Tensile strength at break (g./d.) | Elongation at break, percent | Young's modulus (g./d.) | Hot water shrinkage, percent | Bending and abrasion strengths (frequency) |
|---|---|---|---|---|---|---|
| This invention | 74.7 | 4.2 | 27.1 | 51.3 | 8.1 | 158,000 |
| Comparison | 75.0 | 4.3 | 22.5 | 50.5 | 9.7 | 64,000 |

It is apparent from the above that although the fiber of the invention is of polyamide, it has an extremely high Young's modulus and low hot water shrinkage, and moreover is provided with the property of toughness, as evidenced by the fact that the fiber of the present invention is far superior in blending and abrasion strengths, to the comparative fiber sample representing aromatic polyamides. Furthermore, the fiber of the present invention exhibits a unique and strong luster. A woven fabric made from the fibers of the invention has excellent dimensional stability and is creased to the least extent.

EXAMPLE 7

Two different yarns obtained in example 6 were subjected to a false-twisting process under the following conditions:

Namely, the processing conditions were: a yarn feed-in speed of 45 m./min.; a revolution number of spindle of 150,000 r.p.m.; a length of the heater (curved plate) of 60 cm.; a surface temperature of the heater of 190° C.; a yarn delivery speed of 45 m./min.; a yarn winding speed of 42 m./min.; and a twist number of 3,330 t./m.

The Halanca shrinkages of the textured yarns which had been obtained under such conditions as mentioned above were measured. The yarn of the present invention had an Halanca shrinkage of 286 percent, whereas the comparative test yarn had no more than 189 percent. Further, when unwound from a cone, the textured yarn of the invention was smoothly unwound, while in the comparative test yarn, there were some stuck parts in the yarn wherefor the unwinding was not smoothly carried out.

EXAMPLE 8

Three kg. of 1,13-tridecamethylene diamine i.e., 13 diamine were added to 9 liters of pure water and 2.4 kg. of $(H)_tT$ were added gradually and dissolved thereinto while heating. To the thus formed homogeneous solution was further added a small amount of $(H)_tT$ so as to bring the pH of the solution to neutral. The aqueous solution was poured into 60 liters of isopropanol at room temperature under agitation and then white crystals of 13 (H)T salt were precipitated which were thereafter filtered off and washed thoroughly with isopropanol.

Three kg. of 13 (H)T salt thus obtained, 13 g. of titanium dioxide and 9.1 g. of 13 diamine were incorporated, added to 3.4 kg. of pure water and dissolved thereinto by heating under agitation. The solution was transferred to an 8 liter autoclave previously purged with nitrogen gas, where a heat polycondensation was effected in the same manner as in example 1 with the exceptions of an internal pressure of 20 kg./cm.² and a highest temperature reached of 305° C. at the initial polymerization stage and of an inner temperature of 315° C. during the succeeding reactions at atmospheric and reduced pressures, and chips of 13 (H)T homopolymer were obtained, which had a melting point of 290° C. and an inherent viscosity [η] of 1.0.

Using a screw extruder which was heated at 310° C., the above obtained polymer chips were melt-extruded into and through a nitrogen gas environment heated at 230° C. and formed between the spinneret and 1.5 meters below the spinneret. A freshly spun filament yarn of 170 denier of 27 filaments was wound up on a bobbin. Using a draw-twister, the undrawn yarn was hot-drawn to 3.5 times its original length on a pin heated at 100° C., rollers at 150° C. and a plate at 150°.

The resultant yarn of 50.6 denier possessed a tensile strength at break of 4.1 g./denier, an elongation at break of 20.5 percent, a Young's modulus of 41.7 g./denier, a hot water shrinkage of 7.6 percent, a bending and abrasion strength of 236,000 and a recovery angle of set flexure of 100°.

The drawn yarn of the invention as well as a plain woven fabric made therefrom had an extremely excellent luster.

EXAMPLE 9

Five kg. of 11 diamine were added to 15 liters of water and heating at 98° C., 4.5 Kg. of (H)T consisting of 52 percent of $(H)_tT$ and 48 percent of $(H)_cT$ were gradually added and dissolved thereinto. To the thus obtained homogeneous solution was further added a small amount of (H)T so as to bring the pH of the solution of 96° C. to 6.9. The solution was poured into 100 liters of isopropanol stirring at room temperature and then white crystals of 11 (H)T salt were precipitated, which were filtered from the mother liquid, washed thoroughly with isopropanol. The obtained pure white crystal of nylon salt showed two melting points, one at 180° C. and the other at 205° C.

Then, 2.5 kg. of 11 (H)T salt, 0.4 kg. of ε-caprolactam, 13 g. of titanium dioxide and 7.8 g. of 11 diamine were incorporated, added to 3.4 kg. of pure water and dissolved thereinto by heating under agitation. The solution was transferred to an 8 liter autoclave previously purged with nitrogen gas, where a heat polycondensation was effected in the same manner as in example 1 with the exceptions of an internal pressure of 17 kg./cm.² and a highest temperature reached of 280° C. at the initial polymerization stage and of a reaction temperature of 290° C. during the succeeding reactions at atmospheric and reduced pressures. Chips of 11 (H)T/CL copolymer were obtained, which had a melting point of 265° C., an inherent viscosity [η] in m-cresol solvent at 30° C. of 0.93 and terminal amino groups in an amount of 43.5 meq/kg. Using a screw extruder having a barrel diameter of 20 mm. which was heated at 290° C., the above obtained polymer chips were melt-extruded into and through a nitrogen gas environment heated at 250° C. and formed between the spinneret and 1.5 meters below the spinneret. A freshly spun filament yarn of 250 denier of 18 filaments was wound up on a bobbin. The thus obtained undrawn yarn was hot-drawn to 3.8 times its original length on a roller heated at 120° C. and right thereafter contacted with a surface of a plate heated at 150° C. to heat-set, and the drawn yarn was wound up on a pirn. The obtained drawn yarn of 70.8 denier had a tensile strength at break of 4.5 g./denier, an elongation at break of 20.0 percent, a Young's modulus of 40.1 g./denier, a hot water shrinkage of 11 percent, a bending and abrasion strength of 316,000 times and a recovery angle of set flexure of 115°.

Furthermore, as a comparative sample, polymer chips were obtained by heat copolycondensing, under the same conditions as above, a mixture of 74.2 percent by mole of 11 T salt which was a reaction product of equimolar amounts of 11 diamine and T and 25.8 percent by mole of CL. Using a screw extruder having a barrel diameter of 20 mm., a temperature at its cylinder of 310° C. and a temperature at its spinneret of 320° C., the obtained polymer chips were melt-extruded into and through a nitrogen gas environment heated at 250° C. and formed between the spinneret and 1.5 meters below the spinneret, and a freshly spun yarn of 255 denier of 32 filaments was wound up on a bobbin. The thus obtained yarn was hot-drawn to 3.51 times its original length on a draw pin and a draw roller both heated at 130° C. and set on a plate heated at 160° C.

The thus manufactured comparative yarn of 70 denier of 18 filaments had a recovery angle of set flexure of 75° while a polyester yarn of 70 denier of 18 filaments spun from polyethylene terephthalate having an inherent viscosity [$\eta$] of 0.68 measured in o-chlorophenol at 30° C. had a recovery angle of set flexure of 60°. From these results mentioned above, it is understood that the yarn of the present invention is of excellent quality having not only a Young's modulus equal to that of polyester yarn but also pliant toughness as well as superior resiliency such as possessed by polyester yarn or aromatic polyamide yarn.

EXAMPLE 10

Five kg. of 1,12-dodecamethylene diamine i.e., 12 diamine were added to 15 liters of pure water and 4.3 kg. of (H)T consisting of 30 percent of transform isomer and 70 percent of cis-form isomer were added gradually and dissolved thereinto to form a homogeneous solution to which a small amount of the (H)T was further added so as to bring its pH to 7. The aqueous solution was poured into 100 liters of isopropanol at room temperature under agitation and then white crystals of 12 (H)T salt were precipitated which were thereafter filtered off and washed thoroughly with isopropanol. 2.6 kg. of 12 (H)T salt thus obtained, 0.34 kg. of hexamethylene diammonium adipate, 60 g. of CL, 13 g. of titanium dioxide and 8 g. of 12 diamine were incorporated, added to 3.4 kg. of pure water and dissolved thereinto by heating under agitation. The solution was transferred to an 8 liter autoclave previously purged with nitrogen gas, where a heat polycondensation was effected in the same manner as in example 1 with the exceptions of an internal pressure of 19 kg./cm.² and a highest temperature reached of 290° C. at the initial polymerization stage and of an inner temperature of 310° C. during the succeeding reactions at atmospheric and reduced pressures, and chips of 12 (H)T/66/6 terpolymer were obtained, which had a melting point of 282° C. and an inherent viscosity [$\eta$] of 0.90.

Using a screw extruder which was heated at 305° C., the above obtained polymer chips were melt-extruded and a freshly spun yarn of 262 denier of 36 filaments was wound up on a bobbin. This yarn was hot-drawn to 3.6 times its original length on a draw pin heated at 100° C., heat-set passing on a plate heated at 150° C. and wound on a pirn. The thus obtained drawn yarn of 75.3 denier had a tensile strength at break of 3.8 g./denier, an elongation at break of 29.1 percent, a Young's modulus of 42.0 g./denier, a hot water shrinkage of 12 percent and a bending and abrasion strength of 470,000 times. When the yarn was dyed for 105 minutes at 98° C. in a dye bath having a bath ratio of 1:60 and containing 3 percent of Coomassie Ultra Sky SE 150 (the trade name of acidic dye manufactured by I.C.I. Ltd., England) and 3 percent of glacial acetic acid, the dye receptivity was 52.3 percent and it was ascertained that the yarn of the present invention was superior in its dyeability.

EXAMPLE 11

To 140 g. of 11 (H)T salt prepared in example 9 were added and mixed well 60 g. of a salt of 11 diamine and T, and were further added 520 mg. of 11 diamine. The mixture was dispersed in 150 g. of pure water and the dispersion was charged into a 500 ml. autoclave. After the autoclave was purged thoroughly and repeatedly with nitrogen gas, the mixture was heated until the inner pressure of the autoclave reached 34 kg./cm.² and the temperature was raised to 240° C., and under which conditions the reaction was effected for 2 hours without agitation. After cooling, the autoclave was opened to take out a lump of prepolycondensation product which was crushed and put into a test tube. After replacing the air in the test tube thoroughly by nitrogen gas, the prepolycondensation product was heated for 3 hours under atmospheric pressure as an oil bath at 300° C., to undergo further polycondensation reaction. While decreasing the pressure to 300 mm.Hg, keeping the temperature as it was, the reaction product was defoamed for 30 minutes and thereafter atmospheric pressure was restored. Upon cooling, a pure white stick of copolymer was obtained which had a melting point of 271° C. and an inherent viscosity [$\eta$] in m-cresol at 30° C. of 0.81.

The stick of copolymer was charged to a piston-type melt extruder heated at 320° C. and formed into a freshly spun monofilament yarn of 52 denier. The yarn was then hot-drawn to 3.8 times its original length travelling on a surface of a drum heated at 120° C. The obtained drawn yarn of 15.2 denier had a tensile strength at break of 4.6 g./denier, an elongation at break of 20.8 percent, a Young's modulus of 47.2 g./denier and a hot water shrinkage of 7.2 percent.

EXAMPLE 12

Three kg. of 1,13-tridecamethylene diamine i.e., 13 diamine were added to 9 liters of pure water and 2.4 kg. of (H)T consisting of 100 percent of transform isomer were added gradually and dissolved thereinto to form homogeneous solution to which a small amount of the (H)T was further added so as to bring the pH of the solution to a neutral value. The thus formed aqueous solution was poured into 60 liters of isopropanol at room temperature under agitation and then white crystals of 13 (H)T salt were precipitated which were thereafter filtered off and washed thoroughly with isopropanol.

170 g. of 13 (H)T thus obtained were added with 30 g. of hexamethylene diammonium adipate, mixed well, added with 600 mg. of 13 diamine and dispersed in 150 g. of pure water. From the dispersion, a prepolycondensation product was prepared in a 500 ml. autoclave under the same conditions and in the same manner as in example 11, which was then transferred into a test tube and underwent further polycondensation reaction under atmospheric pressure on an oil bath at 290° C. The obtained polymer had a melting point of 258° C. and an inherent viscosity [$\eta$] of 0.80.

Using a piston-type melt extruder heated at 290° C., the above obtained polymer in a form of stick was spun into an undrawn monofilament yarn which was hot-drawn to 3.8 times its original length under the same conditions and in the same manner as in example 11. The obtained drawn yarn of 15.7 denier had a tensile strength at break of 4.8 g./denier, an elongation at break of 19.7 percent, a Young's modulus of 50.1 g./denier and a hot water shrinkage of 6.8 percent.

EXAMPLE 13

Chips of nylon-6 having an inherent viscosity [$\eta$] of 1.24 and chips of a copolymer having an inherent viscosity [$\eta$] of 0.85 which had been prepared by polycondensing 1,11-undecamethylene diammonium terephthalate i.e., 11 T and 1,11-undecamethylene diammonium hexahydroterephthalate i.e., 11 (H)T, were blended in the equal proportion and dried in a chip blender. Using an extruder having an inside barrel diameter of 20 mm. and temperatures at its cylinder of 300° C. and at its die of 290° C., the blend was kneaded requiring its a dwelling time in the extruder of 20 minutes and extruded from a spinneret provided with 18 orifices into a filament yarn. This yarn wound up on a bobbin at a winding speed of 400 m./min. and thereafter hot-drawn to 3.85 times its original length on a drawing pin heated at 80° C. to provide a drawn yarn of 70 denier of 18 filaments. Several series of experiments were made according to the procedure as described above, varying the copolymerization ratio of the copolymer of 11 T and 11 (H)T.

On the other hand, for the purpose of comparison, polymer blend yarns of 70 denier of 18 filaments were prepared by blending, extruding and drawing under the same conditions and in the same manner as above, with the exception of employment, in lieu of the 11 T/11 (H)T copolymers, of 6 T/6 copolymers having an inherent viscosity $[\eta]$ of 0.90 which were obtained by copolycondensing hexamethylene diammonium terephthalate i.e., 6 T and ε-caprolactam i.e., CL or 6.

Various characteristics and properties measured with respect to those obtained yarns will be given in table 4. The nylon-6 yarn appearing in table 4 was spun under the same conditions as described above.

On the other hand, for the purpose of comparison, an 11 T/6 copolymer having an inherent viscosity $[\eta]$ of 0.91, a melting point of 252° C. and a copolymerization ratio of 87/13 was solely spun and drawn under the same conditions and in the same manner as the above. The obtained yarn of 70 denier of 18 filaments had a tensile strength at break of 4.2 g./denier, an elongation at break of 18 percent and a Young's modulus of 41 g./denier.

The above mentioned yarns of the two kinds and nylon-6 yarn used in example 13 were subjected respectively to a false-twisting process under the following conditions to obtain respective false-twisted textured yarns.

| Heater length | 30 cm. |
| Feed-in speed | 10 m./min. |
| Takeup speed | 10 m./min. |
| Revolution number of spindle | 33,000 r.p.m. |
| Heat set temperature | 140° or 180° C. |

TABLE 4

| Yarn sample | Copolym. ratio of copolymer by mole | Melting point of copolymer (° C.) | Tensile strength at break (g./d.) | Elongation at break, percent | Young's modulus (g./d.) | Recovery after extension, percent | Strength retention after heating, percent | Voltage of charge (v.) |
| --- | --- | --- | --- | --- | --- | --- | --- | --- |
| This invention 11T/11(H)T | 100/0 | 292 | Not spinnable | | | | | |
| | 97/3 | 287 | 4.3 | 18 | 35 | 88 | 96 | +700 |
| | 95/5 | 282 | 4.4 | 19 | 35 | 88 | 96 | +700 |
| | 90/10 | 278 | 4.4 | 19 | 34 | 88 | 95 | +600 |
| | 70/30 | 261 | 4.6 | 19 | 34 | 89 | 93 | +500 |
| | 50/50 | 248 | 4.7 | 20 | 32 | 90 | 91 | +400 |
| | 30/70 | 265 | 4.7 | 21 | 33 | 91 | 93 | +500 |
| | 20/80 | 277 | 4.6 | 20 | 33 | 93 | 94 | +400 |
| | 10/90 | 288 | 4.1 | 20 | 34 | 93 | 94 | +500 |
| Comparison (6T/6) | 80/20 | 302 | Not spinnable | | | | | |
| | 70/30 | 265 | 3.8 | 20 | 25 | 84 | 91 | +1200 |
| | 50/50 | 225 | 4.1 | 21 | 18 | 85 | 83 | +1300 |
| | 30/70 | 154 | 4.4 | 21 | 14 | 82 | 52 | +1500 |
| | 20/80 | 183 | 4.5 | 22 | 15 | 90 | 59 | +1500 |
| | 10/90 | 208 | 4.5 | 22 | 16 | 93 | 69 | +1500 |
| Nylon-6 | | 218 | 4.8 | *24 | 16 | 95 | 82 | +1500 |

As is apparent from table 4, the yarn of the present invention had tensile strength at break and recovery after extension both as high and superior as those of nylon-6 yarn and markedly improved its Young's modulus, heat resistance and antistatic property, in which characteristics nylon-6 yarn was inferior, in and over a widely extended range of the copolymerization ratio of the copolymer employed; whereas, Properties of the obtained yarns will be given in table 5 which follows:

As is apparent from table 5, the yarns of the present invention were capable of forming textured yarns which have high elasticity, superior properties of heat resistance and extremely excellent extensibility and recoverability, whereas the conventional high elastic copolymer which had aromatic rings in-

TABLE 5

| Yarn sample | Heat set temp. (° C.) | Conformation of textured yarn | Strength retention, percent | Young's modulus retention, percent | Extensibility, percent | Recoverability, percent |
| --- | --- | --- | --- | --- | --- | --- |
| This invention (11T/11(H)T/6) | 140 | Good | 95 | 91 | 79 | 72 |
| | 180 | do | 81 | 73 | 91 | 78 |
| Comparison (11T/6) | 140 | A little imperfectly untwisted. | 42 | 45 | 74 | 56 |
| | | Much imperfectly untwisted. | 29 | 41 | | |
| Comparison (nylon-6) | 140 | Good | 87 | 75 | 73 | 61 |
| | 180 | Slightly good | 65 | 63 | 85 | 68 | it is clear that the comparative yarns improved none of their characteristics but Young's modulus and heat resistance with a specified narrow range of their copolymerization ratio.

EXAMPLE 14

Eighty five parts of an 11 T/11 (H)T copolymer having a copolymerization of 87/13, an inherent viscosity $[\eta]$ of 0.91 and a melting point of 252° C. and 15 parts of nylon-6 employed in example 13 were blended in a chip blender and subjected to a melt-extrusion followed by a drawing process under the same conditions and in the same manner as in example 13, and a yarn of 70 denier of 18 filaments having a tensile strength at break of 4.2 g./denier, an elongation at break of 17 percent and a Young's modulus of 45 g./denier was obtained.

troduced into its main molecular chain was inferior to nylon-6 in adaptability for a texturizing process, irrespective of having a high melting point. This is due to the fact that the adaptability for a texturizing process depends upon the softening point of a polymer comprised in the yarn, while conventional copolymers show a sharp lowering of their softening points as the amount of the minor copolymerized component contained therein increases.

EXAMPLE 15

Using two screw extruders both having barrel diameters of 20 mm., nylon-6 having an inherent viscosity $[\eta]$ in m-cresol at 30° C. of 1.25 and a copolymer having an inherent viscosity $[\eta]$ of 0.81 which was a polycondensation product of 1,11-undecamethylene diammonium terephthalate i.e., 11 T and 1,11-undecamethylene diammonium hexahydroterephthalate i.e., 11 (H)T were separately melted and extruded simultaneously at 290° C. from the same spinneret orifices with an extrusion ratio by weight of 1:1, to form unitary filaments wherein the two polymers were disposed in side by side relation along the filament axis. The extruded filament yarn was hot-drawn to 3.8 times its original length on a draw pin heated at 80° C. and a conjugate filament yarn of 70 denier of 18 filaments was obtained.

On the other hand, for the purpose of comparison, another conjugate filament yarn of 70 denier of 18 filaments was prepared under the same conditions and in the same manner as mentioned above with the exception of employment, in lieu of the 11 T/11 (H)T copolymer, of a copolymer having an inherent viscosity $[\eta]$ of 0.81 which had been obtained by copolycondensing 11 T salt and ε-caprolactam i.e., CL. Tensile strength at break, elongation at break, Young's modulus, crimp characteristics and voltage of charge measured with respect to those obtained conjugate filament yarns will be given in table 6 which follows:

The yarn qualities and strength retention after heating measured with respect to the conjugate filament yarns of the above mentioned two kinds and a nylon-66 mono-component filament yarn will be given in table 7 which follows:

TABLE 7

| Yarn sample | Tensile strength at break (g./d.) | Elongation at break, percent | Young's modulus (g./d.) | Strength retention after heating, percent |
| --- | --- | --- | --- | --- |
| Conjugate filament comprising 11(H)T/13T copolymer | 4.3 | 18 | 48 | 91 |
| Conjugate filament comprising 11(H)T/6 copolymer | 4.1 | 19 | 37 | 76 |
| Nylon-66 mono-component filament | 4.5 | 23 | 28 | 79 |

As is apparent from table 7, the yarn of the present invention comprising 11 (H)T/13 T copolymer had a high melting point and comprised a high elastic 11 (H)T/13 T copolymer,

TABLE 6

| Yarn sample | Copolymer used | Copolymn. ratio by mole | Melting point of copolymer (° C.) | Tensile strength at break (g./d.) | Elongation at break, percent | Young's modulus (g./d.) | Crimpability, percent | Crimp elasticity (mg./d.) | Crimp recovery after extension, percent | Voltage of charge (v.) |
| --- | --- | --- | --- | --- | --- | --- | --- | --- | --- | --- |
| This invention | 11T/1(H)T | 100/0 | 295 | Not spinnable | | | | | | |
|  |  | 95/5 | 287 | 4.2 | 19 | 46 | 85 | 10.2 | 95 | −100 |
|  |  | 90/10 | 282 | 4.3 | 18 | 46 | 84 | 10.0 | 93 | +100 |
|  |  | 70/30 | 267 | 4.2 | 18 | 44 | 86 | 9.8 | 90 | +300 |
|  |  | 50/50 | 255 | 4.1 | 19 | 43 | 90 | 9.6 | 88 | +600 |
|  |  | 30/70 | 267 | 4.3 | 18 | 45 | 83 | 9.7 | 90 | +400 |
|  |  | 20/80 | 285 | 4.0 | 18 | 45 | 82 | 9.9 | 94 | +300 |
|  |  | 10/90 | 293 | 3.9 | 18 | 45 | 80 | 10.1 | 95 | +300 |
| Comparison | 11T/6 | 100/0 | 295 | Not spinnable | | | | | | |
|  |  | 95/5 | 286 | 4.2 | 18 | 40 | 81 | 9.6 | 85 | +600 |
|  |  | 90/10 | 275 | 4.3 | 19 | 38 | 82 | 9.2 | 80 | +800 |
|  |  | 70/30 | 235 | 4.2 | 20 | 32 | 85 | 8.4 | 75 | +1100 |
|  |  | 50/50 | 205 | 3.8 | 21 | 30 | 92 | 6.2 | 70 | +1200 |
|  |  | 30/70 | 180 | 3.7 | 20 | 25 | 90 | 4.6 | 67 | +1400 |
|  |  | 20/80 | 185 | 3.5 | 19 | 22 | 78 | 3.9 | 63 | +1400 |
|  |  | 10/90 | 195 | 3.9 | 21 | 20 | 71 | 3.0 | 59 | +1500 |
|  |  | 0/100 | 220 | 4.5 | 24 | 19 | 15 |  |  | +1500 |

As is apparent from table 6, the yarn of the present invention was a woollike crimped yarn with completely improved crimp elasticity and crimp recoverability after extension, in which characteristics conventional crimped conjugate filament yarns have been inferior. Moreover, it was really surprising that the yarn of the present invention was provided with an antistatic property.

so that it was extremely excellent in heat resistance as well as in Young's modulus, while the conjugate filament comprising an 11 (H)T/6 copolymer obtained by using ε-caprolactam as one of its comonomers was the same as nylon-66 mono-component filament in heat resistance and superior in Young's modulus. Therefore, in the present invention, the former is more preferable than the latter.

EXAMPLE 16

Using two screw extruders both having barrel diameters of 20 mm. and heated at 295° C., nylon-66 having an inherent viscosity $[\eta]$ of 1.05 and a melting point of 265° C. and a copolymer having an inherent viscosity $[\eta]$ of 0.91 and a melting point of 275° C. which was a polycondensation product of 75 percent by mole of 1,11-undecamethylene diammonium hexahydroterephthalate i.e., 11 (H)T and 25 percent by mole of 1,13-tridecamethylene diammonium terephthalate i.e., 13 T, were melted separately and extruded at 295° C. simultaneously from the same spinneret orifices with an extrusion ratio of 1:3 so as to form such concentric sheath and core conjugate filaments that the core consisted of nylon-66 and the sheath consisted of the above mentioned copolymer, the obtained conjugate filament yarn was hot-drawn to 3.6 times its original length on a draw pin heated at 80° C. and a drawn conjugate filament yarn of 40 denier of 10 filaments was obtained.

On the other hand, a conjugate filament yarn of 40 denier of 10 filaments was prepared by conjugate spinning and drawing under the same conditions and in the same manner as mentioned above with the exception of employment, in lieu of the 11(H)T/13 T copolymer, of an 11 (H)T/6 copolymer having an inherent viscosity $[\eta]$ of 0.91, a melting point of 235° C. and a copolymerization ratio of 75/25.

EXAMPLE 17

Using two screw extruders having barrel diameters of 20 mm., polyethylene terephthalate having an inherent viscosity $[\eta]$ in o-chlorophenol at 30° C. of 0.65 and a melting point of 265° C. and an 11 T/11 (H)T copolymer having an inherent viscosity $[\eta]$ of 0.92 and a copolymerization ratio among those shown in table 8 were separately melted at 285° C. and 295° C. respectively and extruded simultaneously at an extrusion temperature of 290° C. from a conventional spinneret for spinning sheath and core conjugate filament, with an extrusion ratio of 1:3. The freshly spun eccentric sheath and core conjugate filament yarn of 70 denier of 18 filaments which had a polyester core and a polyamide sheath was wound up on a bobbin at a winding speed of 400 m./min.

On the other hand, for the purpose of comparison, another eccentric sheath and core conjugate filament yarn of 70 denier of 18 filaments was prepared by conjugate spinning and drawing under the same conditions and in the same manner as mentioned above with the exception of employment, in lieu of the above mentioned 11 T/11 (H)T copolymer, of a 6 T/6 copolymer having an inherent viscosity $[\eta]$ of 0.92.

The variations of the characteristics of the conjugate filament yarns of the above mentioned two kinds depending upon copolymerization ratios of copolyamides constituting the conjugate filaments will be shown in table 8.

TABLE 8

| Yarn sample | Copolymn. ratio of copolymer | Melting point of copolymer (° C.) | Tensile strength at break (g./d.) | Elongation at break, percent | Young's modulus (g./d.) | Crimpability, percent | Crimp elasticity (mg./d.) | Crimp recovery after extension, percent | Strenght retention after heating, percent |
|---|---|---|---|---|---|---|---|---|---|
| This invention (11T/11(H)T) | 100/0 | 295 | Not spinnable | | | | | | |
| | 97/3 | 287 | 1.5 | 18 | 74 | 78 | 12.1 | 90 | 93 |
| | 90/10 | 282 | 4.5 | 18 | 74 | 78 | 11.8 | 90 | 93 |
| | 70/30 | 267 | 4.6 | 18 | 73 | 79 | 11.8 | 91 | 91 |
| | 50/50 | 255 | 4.6 | 19 | 73 | 80 | 11.6 | 92 | 90 |
| | 30/70 | 267 | 4.6 | 20 | 73 | 81 | 11.8 | 92 | 92 |
| | 20/80 | 285 | 4.5 | 20 | 72 | 81 | 11.8 | 93 | 93 |
| Comparison (6T/6) | 80/20 | 302 | Not spinnable | | | | | | |
| | 70/30 | 265 | 4.3 | 17 | 69 | 76 | 10.2 | 88 | 89 |
| | 50/50 | 225 | 4.2 | 19 | 53 | 79 | 9.6 | 87 | 84 |
| | 30/70 | 154 | 3.7 | 21 | 32 | 80 | 6.3 | 86 | 69 |
| | 20/80 | 183 | 3.8 | 20 | 38 | 82 | 6.5 | 88 | 80 |
| | 10/90 | 208 | 4.6 | 19 | 39 | 69 | 5.6 | 90 | 85 |

As is apparent from table 8, the yarns of the present invention were woollike crimped filament yarns with markedly improved crimp elasticity, crimp recovery after extension and heat resistance in which properties conventional crimped conjugate filament yarns have been inferior.

EXAMPLE 18

Poly(tridecamethylene terephthalamide/dodecamethylene hexahydroterephthalamide) i.e., a 13 T/12 (H)T copolymer, having an inherent viscosity [η] of 0.88, a melting point of 266° C. and a copolymerization ratio of 30/70 and the polyethylene terephthalate employed in example 17 were conjugate spun and drawn in the same manner as in example 17, with the exceptions of an extrusion ratio of 2:3 and of the arrangement of two polymers being in a concentric sheath and core relation, and a conjugate filament yarn of 75 denier of 36 filaments was obtained.

On the other hand, for the purpose of comparison, the polyethylene terephthalate used in example 17 and nylon-6 were solely spun and drawn under the same conditions and in the same manner as described above and respective monocomponent filament yarns of 75 denier of 36 filaments were obtained.

The characteristics of the conjugate filament yarns of the present invention, polyethylene terephthalate mono-component filament yarn and nylon-6 mono-component filament yarn will be given in table 9 which follows:

TABLE 9

| Yarn sample | Tensile strength at break (g./d.) | Elongation at break, percent | Young's modulus (g./d.) | Recovery after extension, percent | Strength retention after heating, percent |
|---|---|---|---|---|---|
| Yarn of this invention | 4.7 | 19 | 91 | 90 | 96 |
| Polyester yarn | 4.7 | 19 | 97 | 79 | 96 |
| Nylon-6 yarn | 4.8 | 24 | 15 | 95 | 82 |

As is apparent from table 9, the yarn of the present invention was a novel and superior yarn which had obviated drawbacks of nylon-6 and polyester yarns.

What is claimed is:

1. A fiber-forming linear polyamide containing in its main molecular chain, as its structural unit, α, ω-alkylene hexahydroterephthalamide having the following general formula:

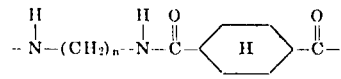

where, n is an integer of 11 to 13.

2. A fiber-forming linear homopolyamide consisting essentially of, as its recurring structural unit, α, ω-alkylene hexahydroterephthalamide as defined in claim 1.

3. A fiber-forming copolyamide consisting essentially of 97–3 percent by mole of α, ω-alkylene hexahydroterephthalamide as defined in claim 1 and 3–97 percent by mole of at least one polyamide structural unit different therefrom.

4. A copolyamide as claimed in claim 3, wherein the said structural unit is α, ω-alkylene terephthalamide having the following general formula:

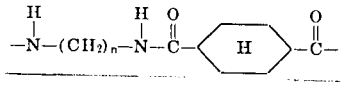

where, n is an integer of 11 to 13.

5. A copolyamide as claimed in claim 4, wherein the number of carbon atoms of the alkylene groups in α, ω-alkylene hexahydroterephthalamide and in α, ω-alkylene terephthalamide are equal.

6. A fiber-forming linear polyamide as claimed in claim 1, which has an inherent viscosity [η] of at least 0.7.

7. A fiber-forming linear polyamide as claimed in claim 6, wherein the inherent viscosity [η] is 0.8–1.2.

8. A polymer blend consisting essentially of a fiber-forming linear polyamide as claimed in claim 1 and at least one aliphatic polyamide.

9. A polymer blend consisting essentially of a fiber-forming linear homopolyamide as claimed in claim 2 and at least one aliphatic polyamide.

10. A polymer blend consisting essentially of a fiber-forming linear copolyamide as claimed in claim 4 and at least one aliphatic polyamide.

11. A polymer blend as claimed in claim 9, wherein the amount of said homopolyamide is 97–3 percent by weight and that of said aliphatic polyamide is 3–97 percent by weight.

12. A polymer blend as claimed in claim 10, which consists of 97–3 percent by weight of said copolyamide and 3–97 percent by weight of said aliphatic polyamide.

13. A polymer blend as claimed in claim 10, which consists of 97–5 percent by weight of said copolyamide and 5–95 percent by weight of said aliphatic polyamide.

14. A polymer blend as claimed in claim 12, wherein said copolyamide consists of 10–97 percent by mole of the α, ω-alkylene terephthalamide and 90–3 percent by mole of the α, ω-alkylene hexahydroterephthalamide.

15. A polymer blend as claimed in claim 8, wherein said aliphatic polyamide is selected from the group consisting of polymerization products of lactams, of aliphatic ω-monoamino-monocarboxylic acids having six–13 carbon atoms and of nylon salts consisting of aliphatic diamine having four–13 carbon atoms and aliphatic dicarboxylic acid having six–13 carbon atoms.

16. A polymer blend as claimed in claim 12, wherein said aliphatic polyamide is selected from the group consisting of polymerization products of lactams, of aliphatic ω-monoamino-monocarboxylic acids having six–13 carbon atoms and of nylon salts consisting of aliphatic diamine having four–13 carbon atoms and aliphatic dicarboxylic acid having six–13 carbon atoms.

17. A drawn fiber which comprises a polyamide as claimed in claim 1.

18. A drawn fiber which consists essentially of a homopolyamide as claimed in claim 2.

19. A drawn fiber which consists essentially of a copolyamide as claimed in claim 3.

20. A drawn fiber which consists essentially of a copolyamide as claimed in claim 4.

21. A drawn fiber which consists essentially of a copolyamide as claimed in claim 5.

22. A drawn fiber which consists essentially of a copolyamide as claimed in claim 6.

23. A drawn fiber which consists essentially of a copolyamide as claimed in claim 7.

24. A drawn fiber which consists essentially of a polymer blend as claimed in claim 8.

25. A drawn fiber which consists essentially of a polymer blend as claimed in claim 9.

26. A drawn fiber which consists essentially of a polymer blend as claimed in claim 10.

27. A drawn fiber which consists essentially of a polymer blend as claimed in claim 11.

28. A drawn fiber which consists essentially of a polymer blend as claimed in claim 12.

29. A drawn fiber which consists essentially of a polymer blend as claimed in claim 13.

30. A drawn fiber which consists essentially of a polymer blend as claimed in claim 14.

31. A drawn fiber which consists essentially of a polymer blend as claimed in claim 15.

32. A drawn fiber which consists essentially of a polymer blend as claimed in claim 16.

33. A crimpable composite filament having at least two components in eccentric relationship across the filament, one component being a synthetic linear polymer selected from the group consisting of polyesters predominantly comprising polyethylene terephthalate and polyamides predominantly comprising poly-ε-caproamide or polyhexamethylene adipamide and as another component eccentric to and continuous with said first component, a copolyamide as claimed in claim 4.

34. A drawn crimpable composite filament as claimed in claim 33, wherein the number of carbon atoms of the alkylene groups in α, ω-alkylene hexahydroterephthalamide and in α, ω-alkylene terephthalamide are equal.

35. A drawn crimpable composite filament as claimed in claim 33, wherein the copolyamide has an inherent viscosity [η] of at least 0.7.

36. A drawn crimpable composite filament as claimed in claim 33, wherein the copolyamide has an inherent viscosity [η] of 0.8–1.2.

37. A drawn crimpable composite filament as claimed in claim 33, wherein the said copolyamide consists of 20–97 percent by mole of the α, ω-alkylene terephthalamide and 80–3 percent by mole of α, ω-alkylene hexahydroterephthalamide.

38. A drawn crimpable composite filament as claimed in claim 33, wherein the melting point of the copolyamide is higher than that of the first component.

39. A drawn crimpable composite filament as claimed in claim 33, wherein the conjugate ratio of the first component and the copolyamide is in the range of 9:1–1:9.

40. A drawn crimpable composite filament as claimed in claim 33, wherein the arrangement of the two components in the cross section of the filament is eccentric sheath and core relation.

41. A drawn crimpable composite filament as claimed in claim 33, wherein the first component consists of at least 90 percent by weight of polyethylene terephthalate and at most 10 percent by weight of at least one polyester different therefrom selected from the group consisting of polyethylene isophthalate, polytetramethylene terephthalate, polyethylene hexahydroterephthalate and polyethylene oxybenzoate.

42. A drawn crimpable composite filament as claimed in claim 33, wherein the first component consists of polyester and the arrangement of the two components in the cross section of the filament is eccentric sheath and core relation.

43. A composite filament having at least two components in concentric sheath and core relation across the filament, one component being a polyester predominantly comprising polyethylene terephthalate and as another component concentric to and continuous with said first component, a copolyamide as claimed in claim 4.

* * * * *